(12) United States Patent
Bearson et al.

(10) Patent No.: US 9,609,880 B2
(45) Date of Patent: Apr. 4, 2017

(54) SYSTEM AND METHOD FOR MANUFACTURING AND PROCESSING A FOOD PRODUCT

(71) Applicant: The Hillshire Brands Company, Chicago, IL (US)

(72) Inventors: Kent M. Bearson, Naperville, IL (US); William K. Lambrite, Naperville, IL (US); Garry J. Benedict, Big Rock, IL (US)

(73) Assignee: The Hillshire Brands Company, Chicago, IL (US)

( * ) Notice: Subject to any disclaimer, the term of this patent is extended or adjusted under 35 U.S.C. 154(b) by 96 days.

(21) Appl. No.: 14/508,877

(22) Filed: Oct. 7, 2014

(65) Prior Publication Data

US 2015/0150271 A1 Jun. 4, 2015

Related U.S. Application Data

(62) Division of application No. 12/001,047, filed on Dec. 5, 2007, now abandoned.

(51) Int. Cl.

| | |
|---|---|
| *A47J 37/12* | (2006.01) |
| *A22C 7/00* | (2006.01) |
| *A22C 17/00* | (2006.01) |
| *B26D 1/143* | (2006.01) |
| *B26D 7/06* | (2006.01) |
| *B26D 7/32* | (2006.01) |
| *A23P 30/10* | (2016.01) |
| *A23L 5/10* | (2016.01) |
| *A23L 13/00* | (2016.01) |

(Continued)

(52) U.S. Cl.
CPC ........ *A22C 7/0053* (2013.01); *A22C 17/0033* (2013.01); *A23L 5/10* (2016.08); *A23L 13/03* (2016.08); *A23P 30/10* (2016.08); *B26D 1/143* (2013.01); *B26D 7/0625* (2013.01); *B26D 7/0683* (2013.01); *B26D 7/32* (2013.01); *A23V 2002/00* (2013.01); *B26D 7/01* (2013.01); *B26D 7/0641* (2013.01); *B26D 2001/0073* (2013.01); *B26D 2210/02* (2013.01); *Y10T 83/0467* (2015.04)

(58) Field of Classification Search
CPC .............................. A22C 17/0033; A23L 1/01
USPC ......... 99/330, 355, 349–351, 353, 384, 441, 99/517; 426/335, 316, 320, 532, 129
See application file for complete search history.

(56) References Cited

U.S. PATENT DOCUMENTS

| | | |
|---|---|---|
| D29,882 S | 12/1898 | Cross |
| 787,887 A | 4/1905 | Baker |
| D68,619 S | 11/1925 | Epstein |

(Continued)

FOREIGN PATENT DOCUMENTS

| | | |
|---|---|---|
| DE | 20104984 U | 6/2001 |
| EP | 0463983 | 1/1992 |

(Continued)

*Primary Examiner* — Phuong Nguyen
(74) *Attorney, Agent, or Firm* — Duane Morris LLP (57) ABSTRACT

A system and method for manufacturing and processing a food product, such as forming, cooking, transporting, and slicing. The food product includes an elongated body having a generally D-shaped cross section. Additionally, the system includes a buffering and equilibrating apparatus which compensates for a difference in cycle times between the cooking system and the slicing system.

11 Claims, 10 Drawing Sheets

(51) Int. Cl.
  *B26D 7/01*    (2006.01)
  *B26D 1/00*    (2006.01)

(56) References Cited

U.S. PATENT DOCUMENTS

| | | | |
|---|---|---|---|
| 1,586,528 | A | 6/1926 | Hoddersen-Balling |
| 2,031,252 | A | 2/1936 | Criner |
| 2,179,672 | A | 11/1939 | Roys |
| 2,246,770 | A | 6/1941 | Wessel |
| 2,682,471 | A | 6/1954 | Alther |
| 2,685,517 | A | 8/1954 | Dunmire |
| 3,162,226 | A | 12/1964 | Toby et al. |
| 3,708,055 | A * | 1/1973 | Miller ............... B65G 47/681 |
| | | | 198/357 |
| 3,911,154 | A | 10/1975 | Weatherspoon |
| 3,972,255 | A | 8/1976 | Irving et al. |
| D266,030 | S | 9/1982 | Madonia |
| 4,525,133 | A | 6/1985 | Bergmann |
| D293,040 | S | 12/1987 | Gagliardi |
| 4,957,271 | A | 9/1990 | Summers et al. |
| 4,980,949 | A | 1/1991 | Stanley |
| 4,984,513 | A | 1/1991 | Choquette |
| 5,005,471 | A | 4/1991 | Dreano |
| 5,009,896 | A | 4/1991 | Becker |
| D339,898 | S | 10/1993 | Lane |
| D340,118 | S | 10/1993 | Lane |
| D340,119 | S | 10/1993 | Lane |
| D340,568 | S | 10/1993 | Lane |
| D341,469 | S | 11/1993 | Evanson et al. |
| D350,789 | S | 9/1994 | Ryaa et al. |
| 5,381,725 | A | 1/1995 | Breunig et al. |
| 5,468,179 | A | 11/1995 | Stanley et al. |
| D379,640 | S | 6/1997 | Gilbert |
| D387,535 | S | 12/1997 | Neuhann |
| D391,735 | S | 3/1998 | Baker |
| 5,862,747 | A | 1/1999 | Handel |
| 5,919,508 | A | 7/1999 | Donnelly et al. |
| 5,921,171 | A | 7/1999 | Dreano |
| 5,974,925 | A | 11/1999 | Lindee et al. |
| 5,988,033 | A | 11/1999 | Skaar et al. |
| 5,992,304 | A * | 11/1999 | Champalaune ......... A47J 27/20 |
| | | | 99/349 |
| D420,465 | S | 2/2000 | Cascio |
| 6,021,995 | A | 2/2000 | Cody |
| 6,085,639 | A | 7/2000 | Dreano |
| D429,866 | S | 8/2000 | Zhang et al. |
| D431,891 | S | 10/2000 | Zhang et al. |
| D439,391 | S | 3/2001 | Sheen et al. |
| 6,200,620 | B1 | 3/2001 | Brinker |
| 6,242,026 | B1 | 6/2001 | Feeley |
| 6,257,132 | B1 * | 7/2001 | Bifulco ............... A22C 9/004 |
| | | | 100/161 |
| 6,401,959 | B1 | 6/2002 | Dreano |
| 6,500,475 | B1 | 12/2002 | Kraklow et al. |
| 6,524,177 | B2 | 2/2003 | Bolzacchini |
| 6,578,133 | B1 | 6/2003 | Hyduke |
| 6,591,723 | B1 | 7/2003 | Jung |
| 6,640,681 | B1 | 11/2003 | Weber |
| 6,712,259 | B1 | 3/2004 | Dreano et al. |
| D488,611 | S | 4/2004 | Childress |
| D488,612 | S | 4/2004 | Childress |
| D488,911 | S | 4/2004 | Childress |
| 6,743,008 | B2 | 6/2004 | Dreano |
| 6,758,133 | B2 | 7/2004 | Weber |
| 6,761,108 | B1 | 7/2004 | Dreano |
| D495,463 | S | 9/2004 | Childress |
| D496,520 | S | 9/2004 | Childress |
| D498,897 | S | 11/2004 | Milker et al. |
| 6,837,030 | B2 | 1/2005 | Drebing et al. |
| D504,751 | S | 5/2005 | Childress |
| D505,241 | S | 5/2005 | Childress |
| D505,531 | S | 5/2005 | Childress |
| D505,532 | S | 5/2005 | Childress |
| D506,051 | S | 6/2005 | Childress |
| 6,919,097 | B2 | 7/2005 | Lamp et al. |
| D509,941 | S | 9/2005 | Prins et al. |
| 6,964,788 | B2 | 11/2005 | Phebus et al. |
| D512,547 | S | 12/2005 | O'Neill |
| D513,651 | S | 1/2006 | Cumpton et al. |
| D514,274 | S | 2/2006 | Cumpton et al. |
| D514,275 | S | 2/2006 | Cumpton et al. |
| D514,276 | S | 2/2006 | Cumpton et al. |
| D515,772 | S | 2/2006 | Cumpton et al. |
| D519,711 | S | 5/2006 | Dreano |
| D519,712 | S | 5/2006 | Cumpton et al. |
| 7,069,840 | B1 | 7/2006 | Howard |
| 7,073,419 | B2 | 7/2006 | Weber |
| D530,057 | S | 10/2006 | Crumpton et al. |
| 7,118,368 | B2 | 10/2006 | Dreano |
| 7,137,325 | B2 | 11/2006 | Bajema et al. |
| D537,606 | S | 3/2007 | Cumpton et al. |
| 7,278,344 | B2 | 10/2007 | Pryor |
| D607,179 | S | 1/2010 | Beyer et al. |
| 7,866,130 | B2 | 1/2011 | Drebing et al. |
| 8,088,425 | B2 | 1/2012 | Nehls et al. |
| 2004/0031363 | A1 | 2/2004 | Lindee et al. |
| 2005/0172828 | A1 | 8/2005 | Dreano |
| 2007/0298147 | A1 * | 12/2007 | Haus ................... A22C 17/10 |
| | | | 426/87 |
| 2008/0250944 | A1 | 10/2008 | Pryor et al. |
| 2009/0188363 | A1 | 7/2009 | Lindee et al. |

FOREIGN PATENT DOCUMENTS

| | | |
|---|---|---|
| EP | 0292417 | 11/1994 |
| EP | 0625325 | 11/1994 |
| FR | 1003069 | 3/1952 |
| FR | 2485884 | 1/1982 |
| FR | 2615484 | 11/1988 |
| FR | 2658483 | 8/1991 |
| FR | 2669004 | 5/1992 |
| FR | 2705217 | 11/1994 |
| FR | 2788199 | 7/2000 |
| WO | 01/21001 | 3/2001 |

\* cited by examiner

SYSTEM AND METHOD FOR MANUFACTURING AND PROCESSING A FOOD PRODUCT

CROSS REFERENCE TO RELATED APPLICATIONS

This application is a Divisional of U.S. patent application Ser. No. 12/001,047 filed on Dec. 5, 2007, now pending, which is incorporated herein by reference in its entirety for all purposes.

BACKGROUND

The present invention relates to a system and method for manufacturing processing a food product.

It is known to produce large quantities of a food product by forming the food product in a mold, then (for certain food products) partially or fully cooking the food product, and then slicing the food product into desired portions or quantities. Such food products included, for example, meat, sausage, ham, cheese and the like.

Devices and methods are generally known for slicing such food products. For example, a cutting apparatus or slicer cuts the products into slices and then transports the sliced portions away for further processing (e.g., packaging) from a collection area adjacent to the slicing apparatus. Some known devices move one or more elongated segments of the food product (e.g., "logs" or "loaves") through similarly shaped apertures in a cutting head to be sliced by a blade. These food product logs typically have circular, rectangular, or semi-circular cross-sections.

However, such food products are not configured for improving efficiency of the slicing operation. For example, the amount of food product sliced per movement (e.g., rotation) of the blade is a metric representative of the efficiency and costs associate with the food manufacturing operation. The known cross-sections leave an undesirable amount of area unoccupied by food products. Accordingly, it would be advantageous to provide a slicing operation that slices more food product per movement of the blade to improve efficiency and reduces costs. It would also be advantageous to provide the food product in a shape that more efficiently uses the space available to be cut (i.e., occupies most of the cutting zone). It would be desirable to provide for a food product processing method and apparatus having one or more of these or other advantageous features. To provide an inexpensive, reliable, and widely adaptable food product processing method and apparatus that avoids the above-referenced and other problems would represent a significant advance in the art.

SUMMARY

The present invention relates to a food product formed in a mold to undergo cooking and processing operations. The food product includes an elongated body having a longitudinal axis, a first side providing a substantially planer surface, a second side extending substantially perpendicular to the first side, a third side extending substantially perpendicular to the first side and substantially parallel to the second side, and a fourth side extending between the second side and the third side and having a convex curvature extending away from the first side. The first side, second side, third side, and fourth side form a substantially D-shaped cross-section taken perpendicular to the longitudinal axis.

The present invention also relates to a method for slicing elongated food products into a plurality of slices with a slicing apparatus that is coupled to a product supply system. The slicing apparatus provides a cutting zone defined at least partially by a cutting head and by a range of movement of a cutting element. The method includes the step of providing a first food product, a second food product, a third food product, and a fourth food product. Each of the food products has an elongated body and an longitudinal axis, a first side providing a substantially planer surface, a second side extending substantially perpendicular to the first side, a third side extending substantially perpendicular to the first side and substantially parallel to the second side, and a fourth side extending between the second side and the third side and having a convex curvature extending away from the first side. The first side, second side, third side, and fourth side form a substantially D-shaped cross-section taken perpendicular to the longitudinal axis. The method also includes the step of arranging the first, second, third, and fourth food products in a series laterally across the cutting zone so that first food product and the fourth food product are located at the outer portion of the cutting head, the second food product is located between the first food product and the third food product, and the third food product is located between the second food product and the fourth food product. The method also includes the step of orientating the fourth side of the first food product and the fourth side of the fourth food product to face in an opposite direction from each other that is outward and away from the second food product and third food product. The method also includes the step of moving the cutting element to slice the food products.

The present invention further relates to an apparatus for slicing a plurality of food products. Each food product has an elongated body having a longitudinal axis a first side providing a substantially planer surface, a second side extending substantially perpendicular to the first side, a third side extending substantially perpendicular to the first side and substantially parallel to the second side, and a fourth side extending between the second side and the third side, and having a convex curvature extending away from the first side. The first side, second side, third side, and fourth side form a substantially D-shaped cross-section taken perpendicular to the longitudinal axis. The improvement includes a cutting head having a plurality of "D"-shaped apertures. Each "D"-shaped aperture is configured to receive one of the "D"-shaped food products. The improvement also includes a cutting element with a cutting edge configured to move through a cutting path adjacent the cutting head. The D-shaped apertures occupy a substantial portion of the cutting zone.

The present invention further relates to a system for manufacturing a food product. The system includes a plurality of food product molds. The system also includes a food product cooking system having plurality of tanks configured to receive the food product molds and to cook the food products within the molds using a heated water solution. The system also includes an apparatus to unload food product logs from the food product molds and onto a first conveying system. The system also includes a buffering and equilibrating apparatus coupled to the plurality of tanks by the first conveying system, and configured to cool core temperatures of the food product logs to a predetermined temperature. The system also includes a slicing apparatus configured to receive food products logs from the buffer and equilibrating apparatus by a second conveyor system and configured to slice the food product logs into a plurality of slices. The cycle time for cooling the food product logs is greater than the cycle time for slicing the food product logs. The buffering and equilibrating apparatus is further configured to compensate for the difference in cycle times between the food product cooking system and the slicing apparatus.

The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments if they fall within the scope of the claims which follow.

Before explaining a number preferred, exemplary, and alternative embodiments of the invention in detail it is to be understood that the invention is not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting.

DETAILED DESCRIPTION OF THE PREFERRED AND EXEMPLARY EMBODIMENTS

Figure 1:
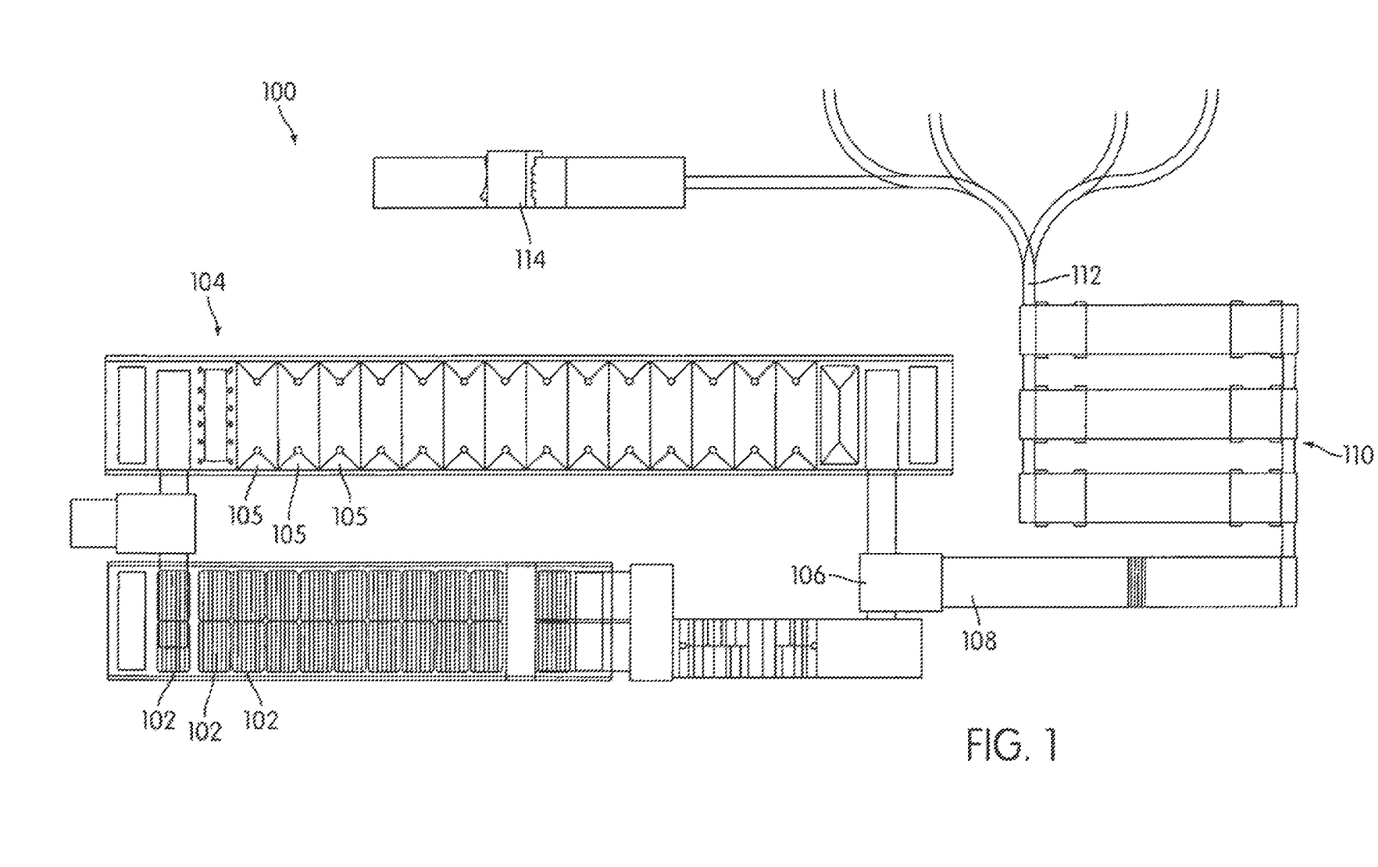
FIG. 1 is an overhead schematic view of a system for manufacturing a food product according to one exemplary embodiment
Figure 2A:
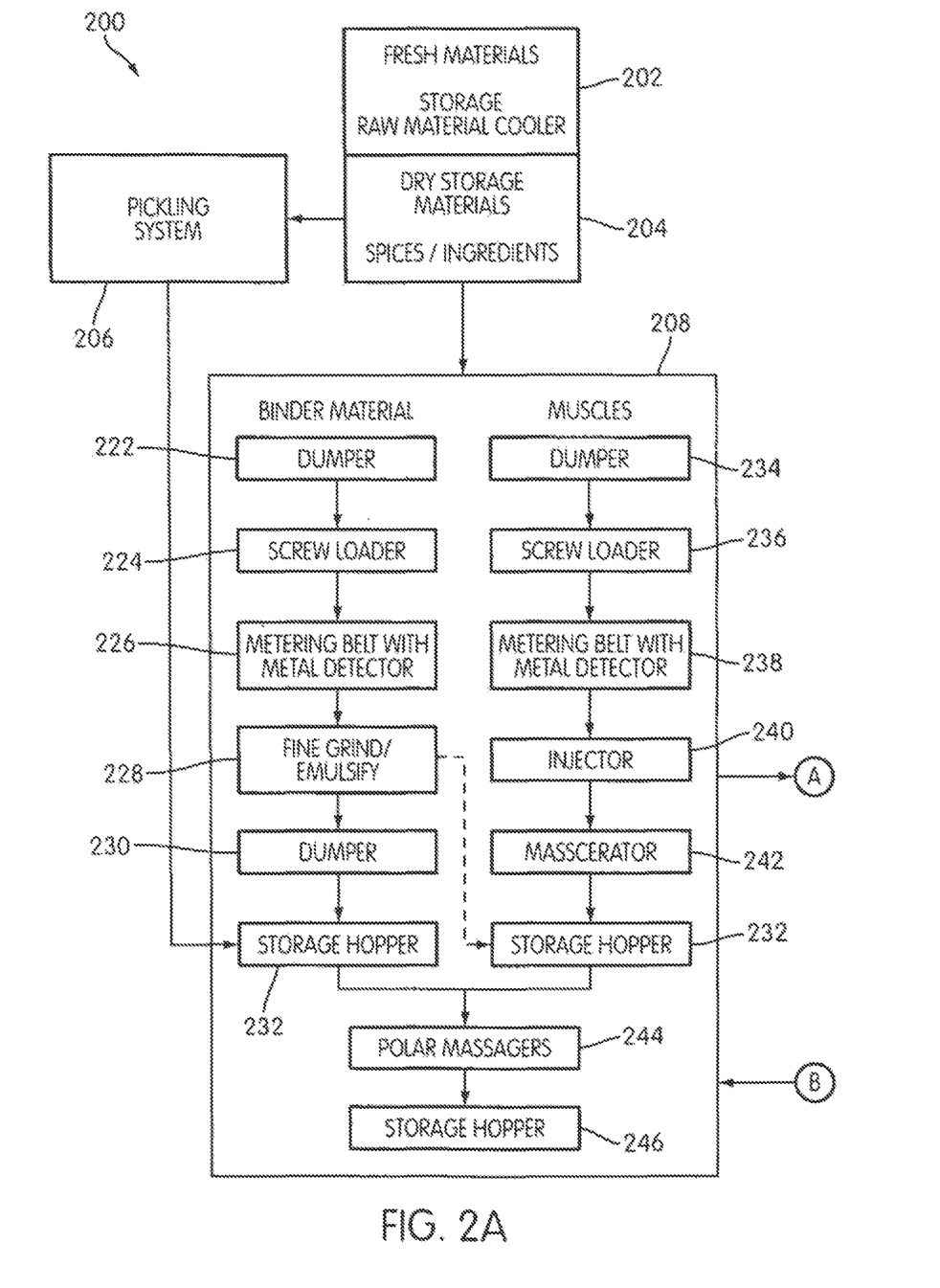
FIGS. 2A-2D is a process flow diagram illustrating a process of manufacturing a food product in the system of FIG. 1 according to an exemplary embodiment.
Figure 2B:
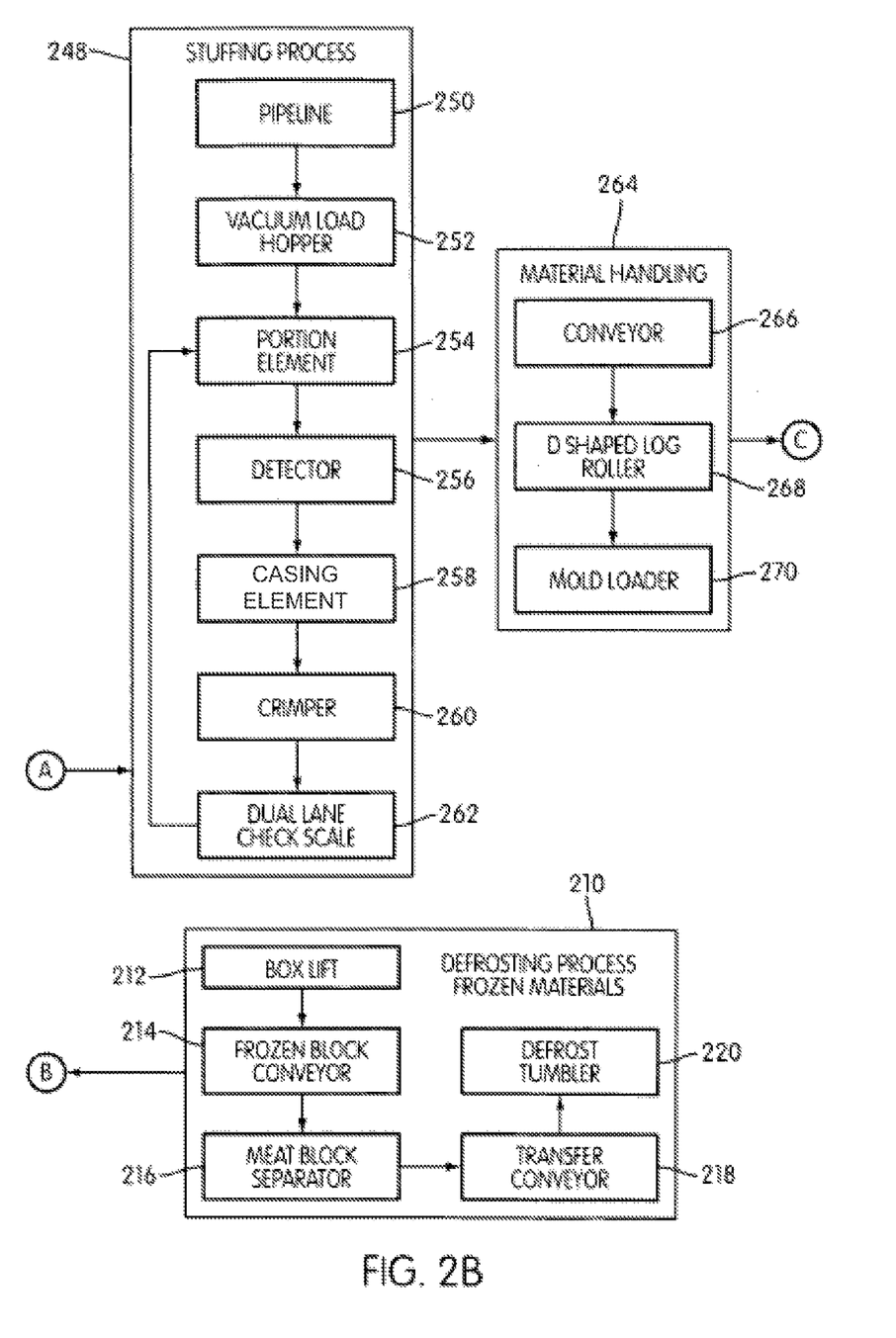
Figure 2C:
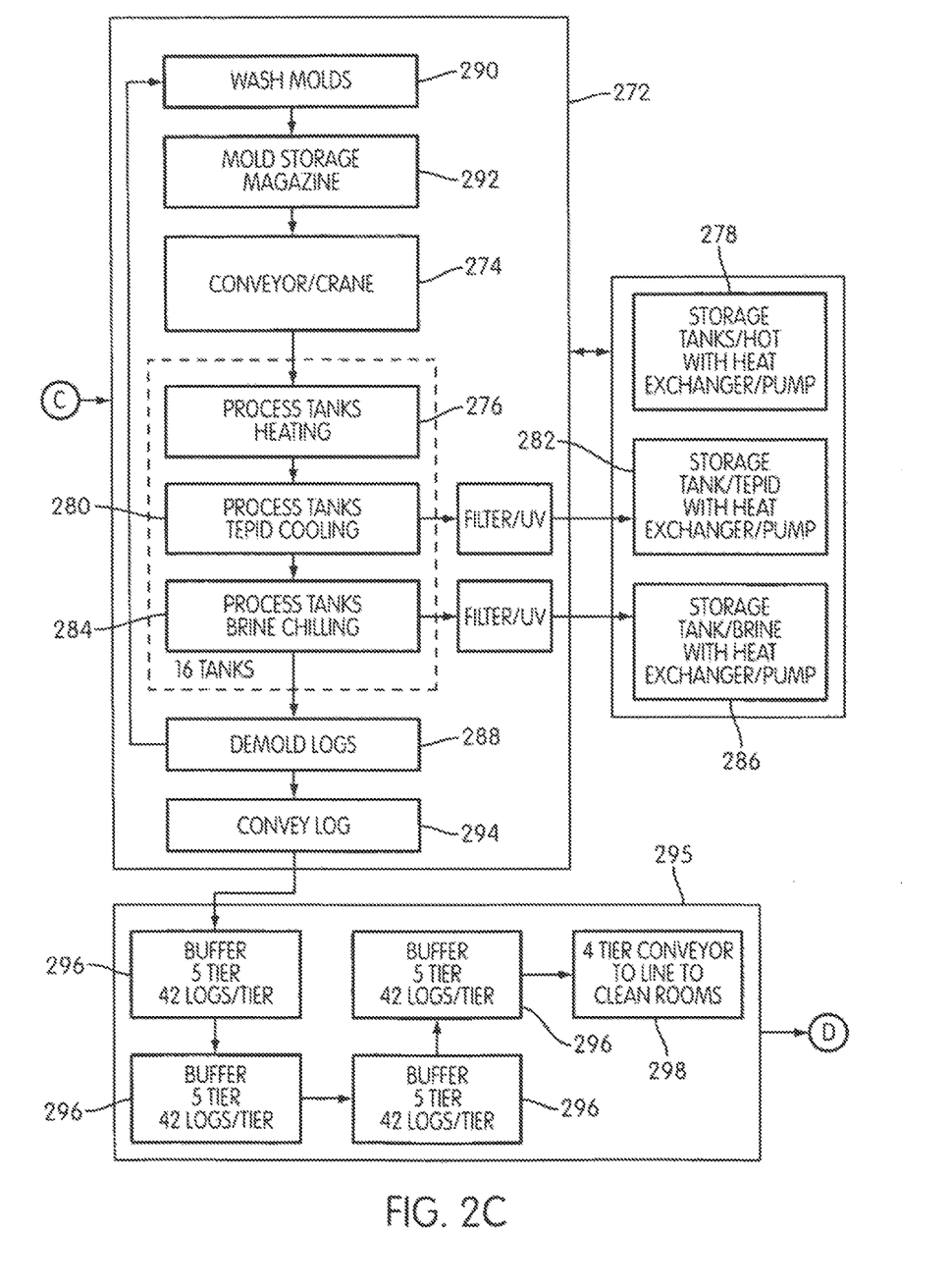
Figure 2D:
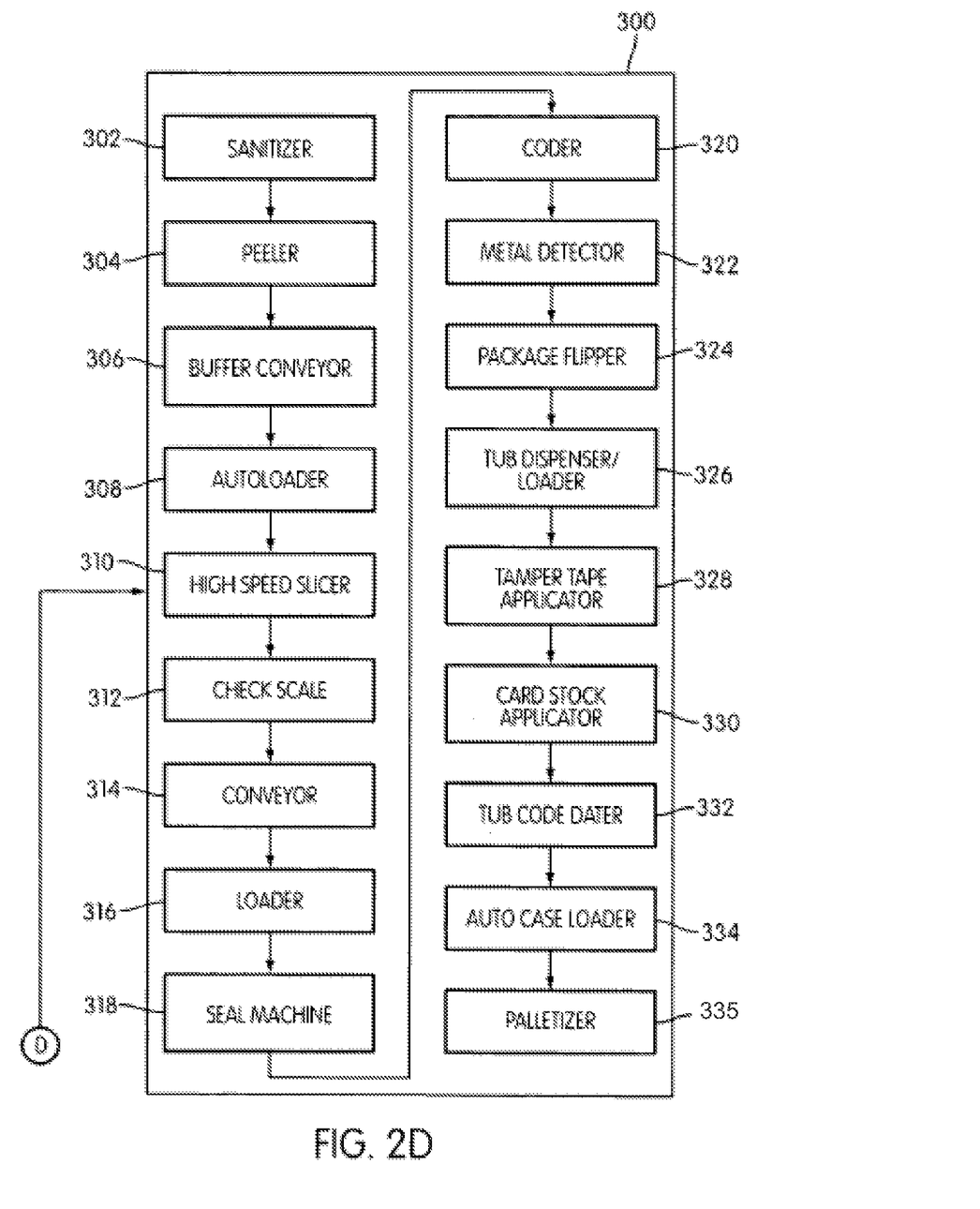

Referring to FIG. 1, a product supply system 100 is configured to manufacture and process a food product. Typically, the food product is cooked, cooled, rinsed, formed to a specific log shape in a mold, collected, chilled to a specified core temperature in a buffer, and sliced into smaller portions. According to various exemplary embodiments, the food product may be sausage, ham, another meat, cheese, or any food product that can be sliced. The system 100 includes one or more food product molds 102, a food product cooking system 104 an apparatus 106 to unload food product logs, a first conveyor system 108, a buffering and equilibrating system 110, a second conveyor system 112, and a slicing apparatus 114.

Molds 102 are generally configured to receive food materials or ingredients and form, compact, press, or squeeze them into a defined shape, for example a D-shape. Food product cooking system 104 typically includes one or more processing tanks 105 and is configured to receive molds 102 and wash and cook the food product in molds 102 using a heated water solution. According to various exemplary embodiments, the heated water solution may be any water-based solution capable of washing and cooking the food products when heated. Apparatus 106 then unloads the formed food product logs from molds 102 onto first conveyer system 108. First conveyor system 108 transports the food product logs to buffering and equilibrating system 110.

Buffering and equilibrating system 110 may be configured to chill/cool the core temperatures of the food product logs to a predetermined temperature. Buffering and equilibrating system 110 may also provide for more efficient transport of the collected food product logs to slicing apparatus 114 via second conveyor system 112. Slicing apparatus 114 receives the food product logs and slices them into a plurality of slices, which may then be packaged and shipped for sale and/or use. According to one exemplary embodiment, the cycle time cooking the food product or for cooling the food product log in buffering and equilibrating system 110 may be greater than the cycle time for slicing the food product logs in slicing apparatus 114. According to other exemplary embodiments, the cycle time for cooling the food product log in buffering and equilibrating system 110 may be less than or equal to the cycle time for slicing the food product logs in slicing apparatus 114. To prevent back-log of food product or down time for an apparatus, the buffer correlates the operating rates for a continuous and efficient operation.

Referring to FIGS. 2A-2D, a process 200 for manufacturing, processing, and slicing a food product on system 100 is shown according to one exemplary embodiment. Fresh materials 202 (e.g., meet, cheese, or other perishable food product from a 3-day storage system, a raw material cooler, etc.) and dry storage materials 204 (e.g., spices, ingredients, etc.) are gathered or unloaded (e.g., from a truck) and sent to a dual pickle making system 206 and/or a raw manufacturing process 208. Frozen generally go through a defrosting process 210 before being sent to raw manufacturing process 208. A box lift 212 lifts boxes of meat to an appropriate working height so a person can open the box and empty the contents onto a frozen block conveyor 214 that moves frozen blocks of meat to a meat block separator 216. Meat block separator 216 is configured to break up the frozen block into pieces to create more surface area. A transfer conveyor 218 then transports frozen pieces to a defrost tumbler 220 that thaws the frozen meat and captures the liquid from the thawing process. The defrosted meat is then sent to raw manufacturing process 208.

In raw manufacturing process 208, binder materials and meat (e.g., whole muscles) are processed in parallel. The binder materials are emptied out of containers by a dumper 222. A screw loader or auger 224 then meters out the materials to roughly a specific portion. A metering belt and metal detector 226 meter the materials more finely so that the individual pieces can be scanned for foreign material contamination (e.g., metal). A fine grinder/emulsifier 228 then larger pieces of fresh or frozen materials to smaller pieces, for example approximately three-eighths of an inch in diameter. The materials are deposited into a storage hopper 232 by a dumper 230 for later processing.

Similar to the binder materials, the meat is emptied out of containers by a dumper 234. A screw loader or auger 236 then meters out the meat to roughly a specific portion. A metering belt and metal detector 238 meter the meat more finely so that the individual pieces can be scanned for foreign material contamination. An injector 240 pumps liquid brines into the meat to provide flavoring and enable the curing process. A masscerator 242 cuts slits into the raw meat to create more surface area for protein to form. The materials are then deposited into storage hopper 232 by a dumper for later processing.

Any fresh and dry materials are processed in dual pickle making systems 206, for example using a polar induction system, are also deposited in storage hopper 232. Polar massagers 244 are used to extract protein from the binder materials and meat in storage hopper 232 to facilitate binding of the individual pieces of meat. The meat is then stored in a storage hopper 246 for use by a stuffing process 248.

Meat is transferred from storage hopper 246 of raw manufacturing process 208 to stuffing process 248 via a pipeline 250. A vacuum load hopper 252 receives the transferred meat and acts as a storage buffer for stuffing process 248. A portion element 254 (e.g., a Handtmann HVF 670 available from Handtmann Inc. of Buffalo Grove, Ill. or a Marlen Opti 340 available from Marlen Research Corp of Shawnee Mission, Kans.) is configured to pump and portion raw meat into a plastic casing. A [pipeline metal] detector 256 scans the pumped product for metal contamination and may reject product when it senses a foreign material (e.g., metal) in the meat. A casing element 258 forms a casing from flat material and it rolls it into a tube with a welded seam so that the meat can be stuffed into it. A crimper 260 cuts the formed casing from above and seals the ends of the casing by attaching a metal clip that crimps both ends of the stuffed casing. A dual lane check scale 262 weighs the stuffed casing and rejects any stuffed casing that is out of specification for a given weight range.

A material handling process 264 receives stuffed logs from stuffing process 248 via a conveyor 266. A D-shaped log roller 268 rolls the stuffed casings into a D shape and a mold loader 270 loads the D-shaped logs into molds 102 for thermal processing.

In a thermal processing system 272, a conveyor/crane 274 loads the molds into a thermal processing tank 105. In the processing tank, the molds are first heated in a step 276 by hot water pumped from storage tanks 278 to cook the meat. At a step 280, tanks 105 and meat are pre-cooled by introducing cold water from a storage tank 282 into tanks 105. At a step 284, tanks 105 and the meat are chilled using a cold salt brine from a storage tank 286. At a step 288, a suction device removes the cooked and chilled logs from the molds. At a step 290, the empty molds are washed and sanitized for reuse. The clean molds are then sent to a mold storage magazine 292 for storage. At a step the demolded logs are rinsed and conveyed to buffering and equilibrating system 110.

Buffering and equilibrating system 295 is configured to distribute logs to individual clean rooms and act as a buffer to equalize the differences in production rates between thermal processing system 272 slicing apparatus 114. In the illustrated exemplary embodiment, buffering and equilibrating system 295 includes four sequential buffers 296 with five tiers and 42 logs per tier. A four tier conveyor 298 transfers the logs to clean rooms for slicing. It is noted that according to other exemplary embodiments, more or fewer than four buffer may be used. According to other exemplary embodiments, more or fewer than five tiers per buffer may be used. According to other exemplary embodiments, more or fewer than 42 logs may be placed on each tier.

Slicing and packaging process 300 receives food product logs from buffering and equilibrating system 110. A sanitizer 302 sanitizes the cased log in preparation for peeling. A peeler 304 removes the clips and casing from the cooked and chilled log. A buffer conveyor 306 provides for an area where any remaining casing may be removed by hand and transports the logs to an autoloader 308. Autoloader 308 loads the logs into a high speed slicer 310. Slicer 310 is configured to slice multiple logs at one time into predefined portions or slices. A check scale 312 then verifies the weight of the sliced portions and those portions out of specification may be rejected. A conveyor 314 moves the sliced portions to a loader 316 that inserts the portions into a seal machine 318 for packaging. Seal machine 318 may, for example, form a film around the portions, vacuumize the formed pockets, flush the pockets with gas and seal the film, which may be cut into individual packages. A coder 320 then prints information related to a processing and/or expiration date/time onto the packing. A detector 322 scans each package for contamination (e.g., metal) and may reject any suspect packages. A package flipper 324 flips the packages over so the non-forming web of the package is facing down. A tub dispenser/loader 326 places a plastic tub on a conveyor so that the sealed food product can be placed inside of it. A tamper tape applicator 328 places a lid on tub and seals it with tamper tape. A card stock applicator 330 places a label on top of the sealed lid to identify the contents of the package. A tub code dater 332 places a coded date on the label to identify production date, lot, etc. An automatic case loader 334, packs the plastic tubs that have been lidded, labeled, dated, and sealed into a box. A palletizer 335 then places the packed boxes onto a wood pallet for shipment to another location, for example for sale or use.

Figure 3:
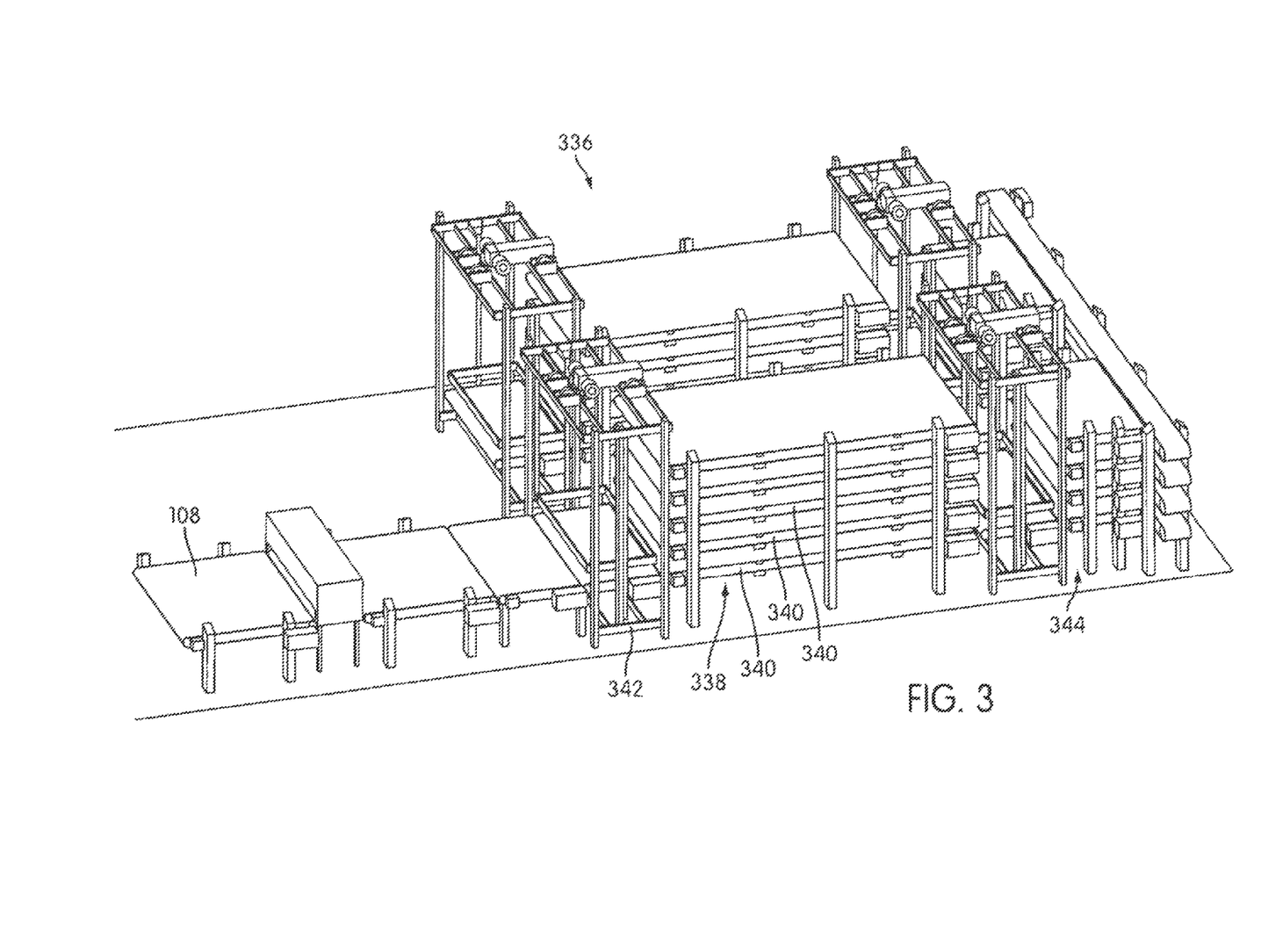
FIG. 3 is a perspective view of a buffering and equilibrating apparatus in the system of FIG. 1 according to an exemplary embodiment.

Referring to FIG. 3, an exemplary buffering and equilibrating system 336 is illustrated. First conveyor system 108 provides a food product to buffering and equilibrating system 336. Buffering and equilibrating system 336 includes at least buffer 338, which includes a number of tiers 340 for temporarily storing food products. A first elevating conveyor 342 is configured to lift and convey the food to an appropriate tier 340. A second elevating conveyor 344 is configured to transfer food product from one buffer 338 to another. The last buffer in buffering and equilibrating system 336 then passes the food product to second conveyor system 112 leading to slicing apparatus 114. It is noted that while the illustrated exemplary embodiment shows two stacked buffers, according to other exemplary embodiments buffering and equilibrating system 336 may include one, three, or four or more stacked buffers.

Figure 4A:
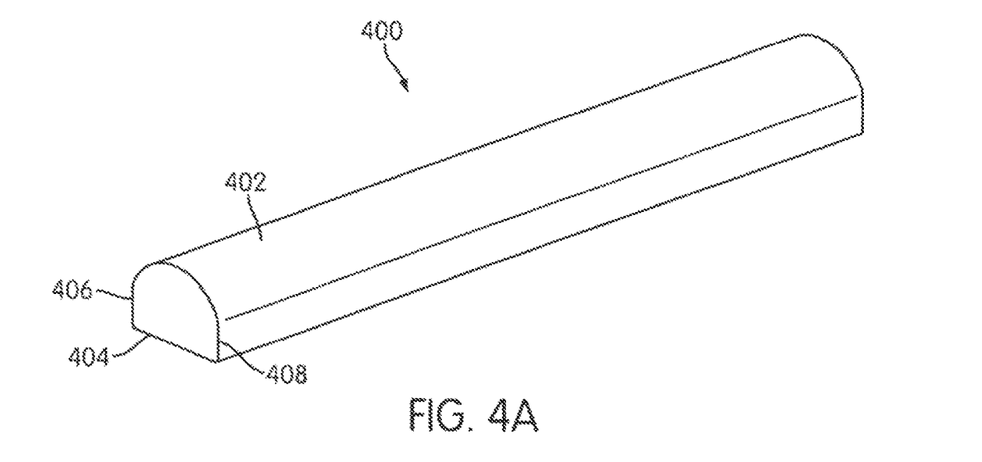
FIG. 4A is a perspective view of a food product log that may be processed in the system of FIG. 1 according to an exemplary embodiment.
Figure 4B:
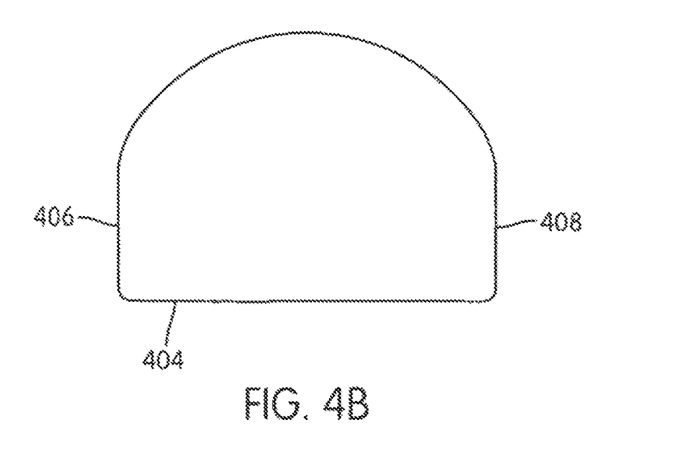
FIG. 4B is an end view of the food product log of FIG. 4A according to an exemplary embodiment.

Referring to FIG. 4A-4B, a food product log 400 includes an elongated body 402 having a longitudinal axis. A first 404 of food product log 400 provides a substantially planar surface. A second side 406 and a third side 408 of food product log 400 extend substantially perpendicular to first side 404 and substantially parallel to the second side. The first second and third sides generally define a rectangular cross-sectional area. According to one exemplary embodiment, the widths of second side 406 and third side 408 may be less than one half the width of first side 404. According to another exemplary embodiment, the widths of second side 406 and third side 408 may be greater than or equal to one-half the width of first side 404. According to another exemplary embodiment, first side 404, second side 406, and third side 408 may each be generally linear. According to another exemplary embodiment one or more of first side 404, second side 406, and third side 408 may include curvature or be curvilinear.

A fourth side 402 of food product log 400 extends between second side 406 and third side 408 and has a convex curvature extending away from first side 404. Fourth side 402 generally defines a semi-circular cross-sectional area. First side 404, second side 406, third side 408, and fourth side 402 define a substantially D-shaped cross-section taken perpendicular to the longitudinal axis. According to one exemplary embodiment, the dimensions of first side 404, second 406, and/or third side 408 relative to the dimension of fourth side 402 may be configured to allow food product log 400 to rest on first side 404, second side 406, or third side 408 without tipping over. According to another exemplary embodiment, second side 406 and third side 408 may provide more than 50 percent of the total height of the D-shaped cross-section and fourth side 402 may provide less than 50 percent of the total height of the D-shaped cross-section. According to another exemplary embodiment, second side 406 and third side 408 may provide less than or equal to 50 percent of the total height of the D-shaped cross-section and fourth side 402 may provide more than or equal to 50 percent of the total height of the D-shaped cross-section.

Figure 5:
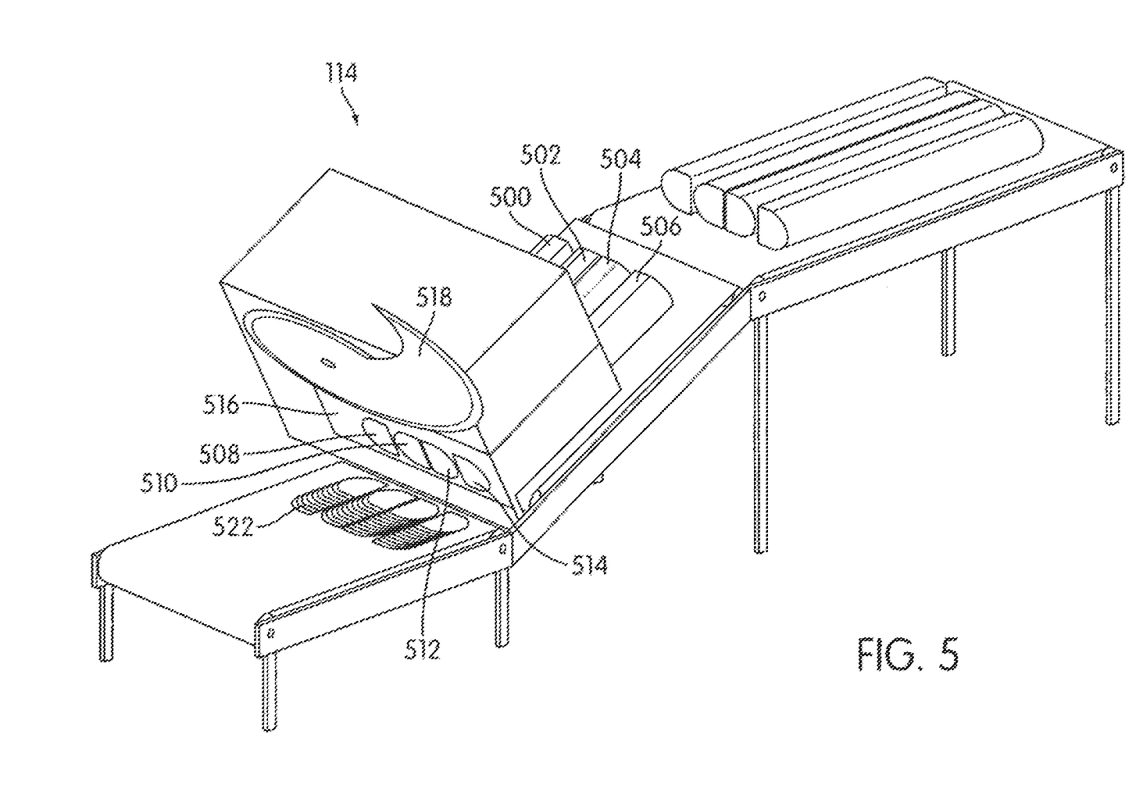
FIG. 5 is a perspective view of an apparatus for slicing a food product manufactured in the system of FIG. 1 according to an exemplary embodiment.
Figure 6:
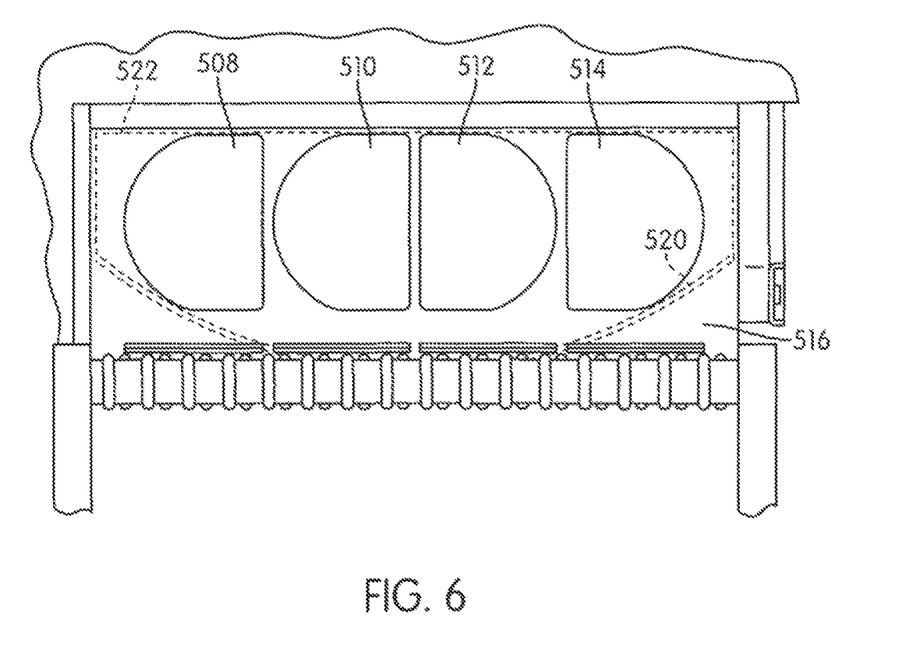
FIG. 6 is an end view of apparatus of FIG. 5 according to an exemplary embodiment.

Referring to FIGS. 5 and 6, slicing apparatus 114 is configured to slice one or more food products, for example a first food product 500, a second food product 502, a third food product 504, and a fourth food product 506, received from product supply system 100. Typically, each food product is similar in shape to food product 400 of FIGS. 4A and 4B and form a substantially D-shaped cross-section taken perpendicular to a longitudinal axis. Each food product proceeds towards slicing apparatus 114 on a conveyor and passes through a generally D-shaped aperture similar in shape to the food product. For example, a first D-shaped aperture 508, a second D-shaped aperture 510, a third D-shaped aperture 512, and a fourth D-shaped aperture 514 receives first, second, third, and forth food products 500, 502, 504, and 506. The D-shaped apertures typically occupy a substantial portion of a cutting head 516. A cutting element or blade 518 with a cutting edge is configured to move through a cutting path 520 adjacent cutting head 516. As the food products are moved through the D-shaped apertures in cutting head 516 by the conveyor from product supply system 100, cutting element 518 is moved to sever slices 522 of the food product logs extending through cutting head 516. Cutting head 516 and cutting path 520 may define a cutting zone.

It is noted that while the use of four food product logs and apertures is illustrated, according to other exemplary embodiments, more or fewer than four food product logs may be sliced and slicing apparatus 114 may define more or fewer than four apertures. According to one exemplary embodiment, each aperture may be spaced apart along a line exiting across the cutting head. According to another exemplary embodiment, the apertures may be spaced in a staggered or uneven alignment that is not across a single line. According to another exemplary embodiment, the fourth side of first food product 500 and the fourth side of fourth food product 506 may be orientated to face in an opposite direction from one another that is generally outward and away from second food product 502 and third food product 504. According to, exemplary embodiment, the first sides of first food product 500 and second food product 502 may be orientated to face an opposite direction towards one another. According to another exemplary embodiment, each food product may be orientated on a like side. According to still other exemplary embodiments, the food products may be orientated in any combination of the orientations described above.

Figure 7:
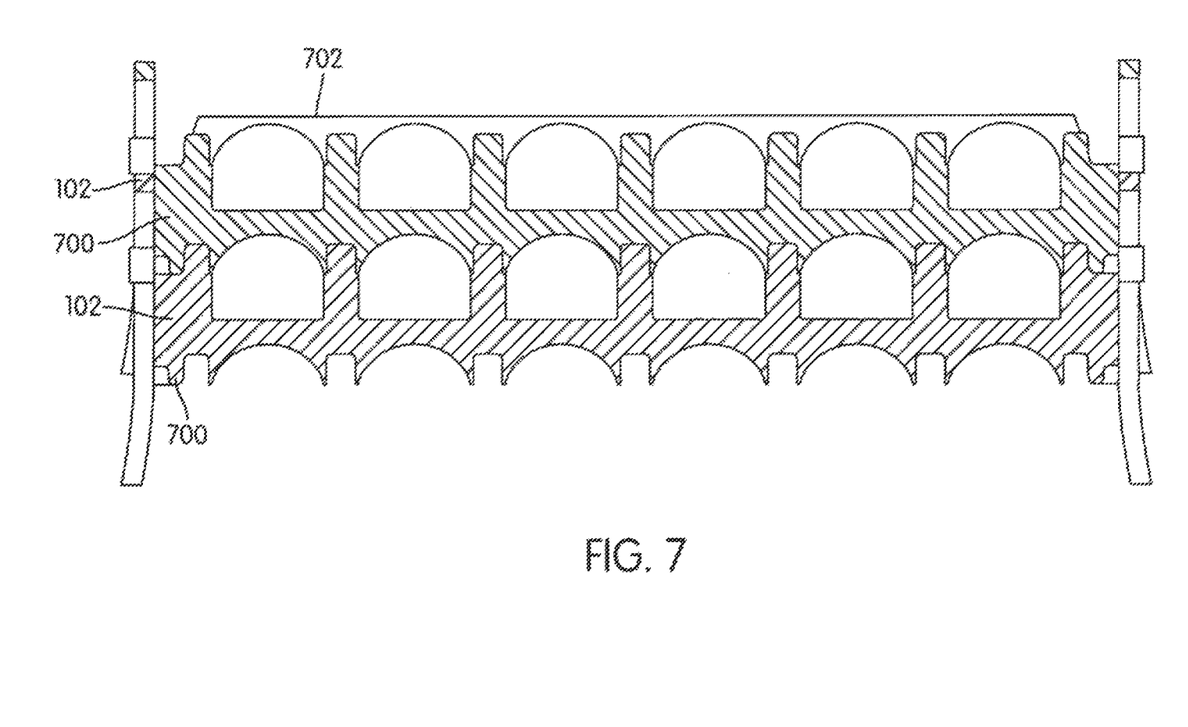
FIG. 7 is a section view of two molds that may be used in the system of FIG. 1.

Referring to FIG. 7, two exemplary food product molds 102 are stacked on each other and configured to shape food products into the D-shaped logs shown in 4A and 4B. Each mold 102 generally includes a base 700 and a cover 702 that define a D-shaped elongated mold area. In the illustrated embodiment, base 700 of the top mold may be the cover for the bottom mold. The food product logs are orientated in the mold with the first side located at the bottom of base 700 and the fourth side of the log located near cover 702. While FIG. 7 illustrates food product mold 102 as defining two rows of six molding areas, according to other exemplary embodiments the food product mold may include more or fewer than two rows and/or six molding areas per row.

It is important to note that the terms "log," "food product," and "slicer" are intended to be broad terms and not teens of limitation. These components may be used with any of a variety of food products or arrangements and are not intended to be limited to use with meat applications. For purposes of this disclosure, the term "coupled" shall mean the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate member being attached to one another. Such joining may be permanent in nature or alternatively may be removable or releasable in nature. Such joining may also relate to mechanical, fluid, or electrical relationship between the two components.

It is also important to note that the construction and arrangement of the elements of the food product supply system 100 as shown in the preferred and other exemplary embodiments are illustrative only. Although only a few embodiments invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the subject matter recited in the claims. For example, while the components of the disclosed embodiments will be illustrated as a system, process, slicer designed for a meat food product, the features of the disclosed embodiments have a much wider applicability—the food product supply system design is adaptable for other food products that are cooked and handled and/or sliced. Further, the size of the various components and the size of the containers can be widely varied. Accordingly, all such modifications are intended to be included within the scope of the present invention as defined in the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design operating conditions and arrangement of the preferred and other exemplary embodiments without departing from the spirit of the present invention as expressed in the appended claims.

What is claimed is:

1. A system for manufacturing a food product, the system comprising:
a portion element configured to stuff food product into casings to form food product logs; a plurality of food product molds configured to hold the food product logs; a food product cooking system having a plurality of thermal processing tanks configured to receive the food product molds holding the food product logs and to cook the food product logs within the food product molds using a heated water solution; a first conveying system;
an apparatus to unload the food product logs from the food product molds and onto the first conveying system;
a buffering and equilibrating apparatus configured to receive the food product logs from the first conveying system, and to cool core temperatures of the food product logs to a predetermined temperature; and
a second conveying system configured to convey the food products logs from the buffer and equilibrating apparatus to a slicing apparatus configured to slice the food product logs into a plurality of slices; and
wherein the cycle time for cooling the food product logs is different than the cycle time for slicing the food product logs,
wherein the buffering and equilibrating apparatus is further configured to compensate for the difference in cycle times between the food product cooking system and the slicing apparatus, and
wherein the plurality of food product molds are stacked on each other and configured to shape the food products into a D-shaped food product logs.

2. The system of claim 1 further comprising a log roller configured to shape the stuffed food product logs such that each food product log has an elongated body having a longitudinal axis, a first side providing a substantially planer surface, a second side extending substantially perpendicular to the first side, a third side extending substantially perpendicular to the first side and substantially parallel to the second side, a fourth side extending between the second side and the third side, and having as convex curvature extending away from the first side, wherein the first side, second side, third side, and fourth side form a substantially D-shaped cross-section taken perpendicular to the longitudinal axis, wherein each food product mold comprises a base and a cover and the food product logs are orientated in the mold with the first side located at the bottom of the base and the fourth side provided by the cover.

3. The system of claim 2, wherein the food product molds are stacked molds and at least a portion of the food product molds comprise a portion forming the base for an upper food product mold and forming the cover for a lower food product mold.

4. The system of claim 1 wherein the cycle time for cooling the food product logs is greater than the cycle time for slicing the food product logs.

5. The system of claim 4, further comprising a plurality of clean rooms, wherein the buffering and equilibrating apparatus is configured to distribute the food product logs to the plurality of clean rooms to equalize the difference in cycle times for cooling the food product logs and for slicing the food product logs.

6. The system of claim 1 wherein the buffering and equilibrating apparatus comprises a plurality of buffers with a plurality of tiers.

7. The system of claim 6 further comprising a multi-tier conveyor configured to transfer the food product logs to the slicing apparatus, wherein the multi-tier conveyor has fewer tiers than the buffers.

8. The system of claim 1, wherein the food product cooking system is further configured to:
pre-cool the food product logs, after cooking the food product logs, by introducing cold water into the plurality of thermal processing tanks; and
chill the food product logs and the plurality of tanks using a cold salt brine.

9. The system of claim 1, wherein the buffering and equilibrating apparatus includes a plurality of tiers, and the first conveying system comprises a first elevating conveying system configured to lift and convey the food product logs to the plurality of tiers, the system further comprising:
a third conveying system comprising a second elevating conveying system configured to transfer food product logs from one tier to another tier.

10. The system of claim 1, wherein the second conveying system is configured to arrange the food product logs laterally on a conveyor so that each food product log is oriented to rest, without tipping over, on one of the second side or the third side.

11. The system of claim 1, further comprising:
a sanitizer to sanitize the food product logs while in the casings; and
a peeler to remove the casings from the food product logs prior to the slicing apparatus slicing the food product logs.

* * * * *

UNITED STATES PATENT AND TRADEMARK OFFICE
CERTIFICATE OF CORRECTION

PATENT NO.         : 9,609,880 B2
APPLICATION NO.    : 14/508877
DATED              : April 4, 2017
INVENTOR(S)        : Kent M. Bearson et al.

It is certified that error appears in the above-identified patent and that said Letters Patent is hereby corrected as shown below:

In the Specification

In Column 4, Line 41 between the words 'Frozen' and 'generally' please insert --materials--.

In Column 8, Line 39 between the words 'embodiments' and 'invention' insert --of the--.

Signed and Sealed this
Twenty-fifth Day of September, 2018

Andrei Iancu
*Director of the United States Patent and Trademark Office*